(No Model.) 2 Sheets—Sheet 1.

J. E. EMERSON & T. MIDGLEY.
BELTING.

No. 386,303. Patented July 17, 1888.

Witnesses.

Inventor,
James E. Emerson.
Thomas Midgley.
By their Attorneys,
Johnston, Reinohl & Dyre.

(No Model.) 2 Sheets—Sheet 2.

J. E. EMERSON & T. MIDGLEY.
BELTING.

No. 386,303. Patented July 17, 1888.

Witnesses,
Inventor,
James E. Emerson
Thomas Midgley.
By their Attorneys,
Johnston, Reinohl & Dyre.

UNITED STATES PATENT OFFICE.

JAMES E. EMERSON AND THOMAS MIDGLEY, OF BEAVER FALLS, PENNSYLVANIA.

BELTING.

SPECIFICATION forming part of Letters Patent No. 386,303, dated July 17, 1888.

Application filed January 24, 1888. Serial No. 261,789. (No model.)

*To all whom it may concern:*

Be it known that we, JAMES E. EMERSON and THOMAS MIDGLEY, citizens of the United States, residing at Beaver Falls, in the county of Beaver and State of Pennsylvania, have invented certain new and useful Improvements in Belting; and we do hereby declare the following to be a full, clear, and exact description of the invention, such as will enable others skilled in the art to which it appertains to make and use the same.

Our invention relates to belting, and has for its object the construction of a cheap, effective, and durable belt.

The invention will be hereinafter described, and particularly pointed out in the claims.

Figure 1:
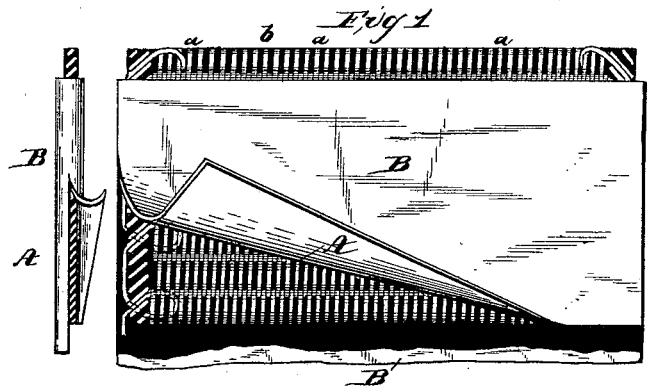
Figure 2:
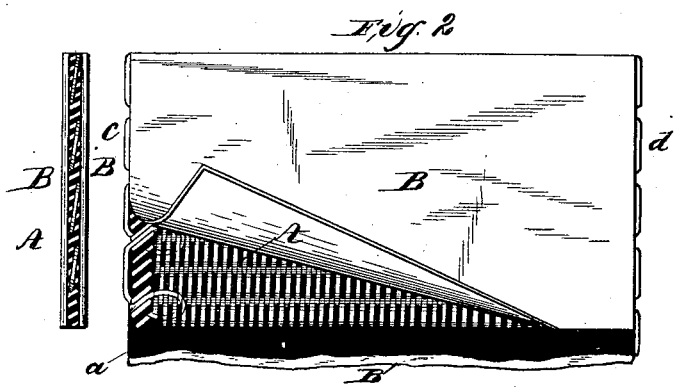
Figure 3:
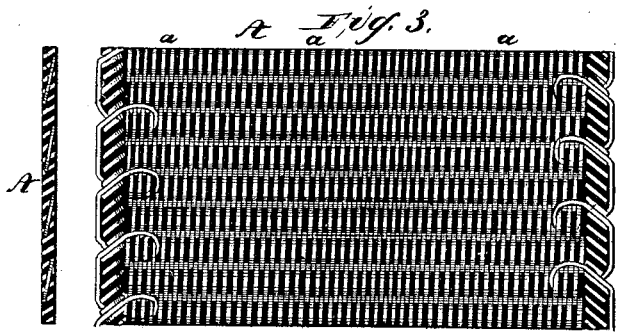
Figure 4:
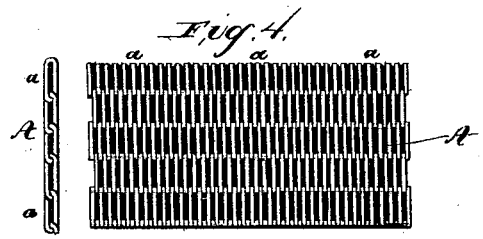
Figure 5:
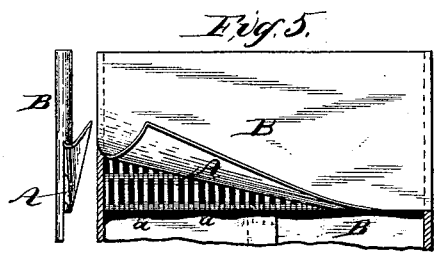
Figure 6:
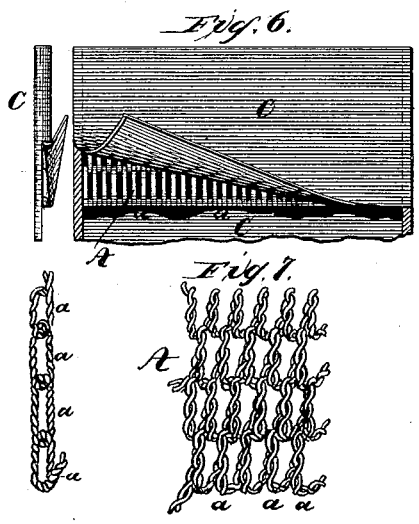
Figure 7:
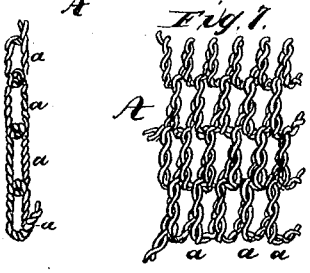

In the accompanying drawings, which form a part of this specification, Figure 1 represents a plan, partly in section, and an end view of a section of a belt in which the body is covered with canvas or rubber. Fig. 2 is a similar view in which the faces of the belt only are covered. Fig. 3 is a similar view of a section of a belt in which the interstices between the elongated links are filled with rubber or other plastic material. Fig. 4 is a plan and an edge view of a section of a belt or the body portion of a belt composed of interwoven elongated links without edge coils. Fig. 5 represents a plan, partly in section, and an edge view of a belt in which the body constructed as shown in Fig. 4 is covered with canvas. Fig. 6 is a similar view of the same body covered with rubber or rubber cloth; and Fig. 7 shows a body portion or a section of a wire belt in which the links are formed of twisted or braided strands of wire.

Reference being had to the drawings and the letters marked thereon, A in Figs. 1, 2, and 3 indicates the body of a belt which is constructed of wire in the manner set forth in our patent, No. 371,181, bearing date of October 11, 1887, with the interstices between the elongated links *a* filled with rubber, gutta-percha, or other suitable plastic flexible material. B is a covering of canvas or rubber cloth, which incloses the body of the belt covering the edges, as shown in Fig. 1. In this construction one end section, *b*, of the transverse flattened coils is left uncovered to facilitate the securing the ends of the belt by means of a coil or a strand of wire.

In Fig. 2 is shown a section of a belt in which the wire body A is covered on its faces or sides with canvas or rubber cloth, B, leaving metallic working-edges *c d*, for engagement with the arms or rods of a shipper. In this construction all the adhesive properties of a rubber belt are obtained, while the disadvantages of a soft edge on the belt are obviated by providing metallic working-edges for the belt.

In Fig. 3 is shown a section of a belt in which the body A is constructed as in the two former-described belts, with the interstices between the elongated links *a* filled with rubber. In this construction the faces of the belt are composed of metal and rubber, thus securing the advantage of the frictional contact of the metal and the adhesive properties of the rubber with the pulley on which the belt runs, while the weight and expense of the former two constructions are materially reduced.

In Fig. 4 the body A of the belt is composed of elongated links *a*, as in the former construction, but no edge coils are applied thereto.

In Fig. 5 the body A, constructed as in Fig. 4, is covered with canvas B, and in Fig. 6 the same body A is covered with rubber or rubber cloth C. In either of these constructions (shown in Figs. 4, 5, and 6) the interstices between the links *a* are filled with rubber, as in Figs. 1, 2, and 3.

In Fig. 7 is shown a section of a belt or body portion, A, of a belt, in which the links *a* are constructed of two or more strands of wire, which are twisted or braided, then coiled, and provided with (or without) edge coils, and afterward rolled and tempered. In this construction the strength of the belt is greatly increased, and it may be coated with rubber, which enters and fills the interstices, the rubber adhering to the irregular surface of the links with great tenacity; or it may be covered with canvas or with rubber or rubber cloth, as in the other constructions.

In constructing our improved belting we take the wire body A, after it has been rolled and tempered, and coat it with rubber, gutta-percha, or other plastic and flexible material, and then again pass it between steam-heated rolls under sufficient pressure to force the rubber into the interstices between the elongated links and completely fill them from surface to surface of the thickness of the body A. By this construction the working-surface of the belt becomes compound, or of metal and rubber. If it is desired to produce a belt of the character shown in Figs. 1, 3, 5, and 6, the body of the belt is covered with canvas or rubber cloth, and the belt again passed between rolls under pressure sufficient to cause the canvas or rubber cloth to adhere to the rubber, which fills the interstices between the links and forms part of the surface of the belt.

In constructing the belt shown in Fig. 2 the wire body, with the rubber filling and interstices, is faced with canvas or rubber cloth, which does not quite extend across its entire width, thus leaving a metallic surface or working-edge for the belt. The belt is then passed through or between rolls, as in the former construction, and the canvas or rubber cloth made to adhere to the rubber, as heretofore described.

In lacing-belts of the construction shown a strand of wire may be employed, and holes pierced through the belt back of the first or end transverse section of links. After the ends of the belt have been secured, the wire strand will embed itself in the canvas or rubber surface of the belt and form a smooth surface.

The method involved in our invention forms subject-matter of another application for Letters Patent, Serial No. 265,721.

Having thus fully described our invention, what we claim is—

1. As an improved article of manufacture, a belt composed of elongated wire links having the interstices between the links filled with rubber and forming a compound or metallic and rubber surface, substantially as described.

2. As an improved article of manufacture, a belt composed of elongated wire links having the interstices between the links filled with rubber and provided with metallic working-edges, substantially as described.

3. As an improved article of manufacture, a belt the surfaces of which are covered with canvas or rubber cloth and provided with metallic working-edges, substantially as described.

In testimony whereof we affix our signatures in presence of two witnesses.

JAMES E. EMERSON.
THOS. MIDGLEY.

Witnesses:
J. F. MERRIMAN,
JOHN REEVES.